US010796297B2

United States Patent
Lee et al.

(10) Patent No.: US 10,796,297 B2
(45) Date of Patent: Oct. 6, 2020

(54) METHOD AND ELECTRONIC DEVICE FOR SECURE MAGNETIC PULSE TRANSMISSION

(71) Applicant: Samsung Electronics Co., Ltd., Gyeonggi-do (KR)

(72) Inventors: Hui Jae Lee, Gyeonggi-do (KR); Hyung Il Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 458 days.

(21) Appl. No.: 15/859,838

(22) Filed: Jan. 2, 2018

(65) Prior Publication Data

US 2020/0151700 A1 May 14, 2020

(30) Foreign Application Priority Data

Jan. 3, 2017 (KR) ........................ 10-2017-0000602

(51) Int. Cl.
*G06Q 20/32* (2012.01)
*G06Q 20/20* (2012.01)
*H04B 5/00* (2006.01)
*G11B 5/09* (2006.01)
*G11B 5/00* (2006.01)

(52) U.S. Cl.
CPC ......... *G06Q 20/327* (2013.01); *G06Q 20/202* (2013.01); *H04B 5/0031* (2013.01); *G11B 5/09* (2013.01); *G11B 2005/0029* (2013.01)

(58) Field of Classification Search
CPC ...... G06Q 20/20; G06Q 20/202; G06Q 20/32; G06Q 20/327; G11B 2005/0029; G11B 5/09; H03K 7/00; H04B 5/0031
See application file for complete search history.

(56) References Cited

U.S. PATENT DOCUMENTS

| 8,628,012 | B1 | 1/2014 | Wallner |
| 8,690,059 | B1 | 4/2014 | Wallner |
| 8,925,826 | B2 | 1/2015 | Liu et al. |
| 9,123,036 | B2 | 9/2015 | Graylin et al. |

(Continued)

FOREIGN PATENT DOCUMENTS

| KR | 10-2015-0095889 A | 8/2015 |
| KR | 10-2016-0023750 A | 3/2016 |

(Continued)

OTHER PUBLICATIONS

International Search Report dated Apr. 23, 2018

*Primary Examiner* — Khanh C Tran
(74) *Attorney, Agent, or Firm* — Cha & Reiter, LLC.

(57) ABSTRACT

An electronic device and related operations are disclosed, including a communication circuit, a memory and a magnetic stripe transmission (MST) module for radiating a magnetic pulse. A processor implements the operations, including: controlling the MST module to change an emitted radiation pattern of the magnetic pulse in prespecified order to iteratively emit the plurality of radiation patterns, in response to detecting a prespecified event, selecting a presently emitted radiation pattern of the magnetic pulse, and storing information corresponding to the selected radiation pattern in the memory, or transmitting the information corresponding to the selected radiation pattern to the server.

20 Claims, 12 Drawing Sheets

(56) References Cited

U.S. PATENT DOCUMENTS

| | | | |
|---|---|---|---|
| 9,412,105 | B2 | 8/2016 | Graylin et al. |
| 2012/0280035 | A1 | 11/2012 | Liu et al. |
| 2014/0249948 | A1 | 9/2014 | Graylin et al. |
| 2014/0279437 | A1 | 9/2014 | Lee et al. |
| 2015/0324788 | A1 | 11/2015 | Graylin et al. |
| 2015/0363771 | A1* | 12/2015 | Graylin ................ G06Q 20/12 705/65 |
| 2015/0371234 | A1 | 12/2015 | Huang et al. |
| 2016/0125417 | A1 | 5/2016 | Huang et al. |
| 2016/0217467 | A1* | 7/2016 | Smets ............... G06Q 20/3226 |
| 2017/0017961 | A1* | 1/2017 | Kim .................... G06Q 20/204 |
| 2017/0186015 | A1* | 6/2017 | Jin ........................ G06Q 20/32 |
| 2018/0183254 | A1* | 6/2018 | Park ..................... H02J 7/0071 |
| 2018/0211579 | A1* | 7/2018 | Bae ..................... G09G 3/2003 |

FOREIGN PATENT DOCUMENTS

| | | | |
|---|---|---|---|
| KR | 10-2016-0077171 A | 7/2016 | |
| KR | 10-2016-0105026 A | 9/2016 | |
| WO | 2012/151226 A2 | 11/2012 | |

\* cited by examiner

601

P1

-Track number : 2
-Baud rate    : 200
-Lead Zero    : 30
-Tail Zero    : 15
-Delay        : 0

-Track number : 2
-Baud rate    : 200
-Lead Zero    : 30
-Tail Zero    : 15
-Reverse
-Delay        : 950

602

P2

-Track number : 2
-Baud rate    : 800
-Lead Zero    : 30
-Tail Zero    : 30
-Delay        : 950

· · ·

622

P22

-Track number : 1
-Baud rate    : 800
-Lead Zero    : 30
-Tail Zero    : 30
-Delay        : 0

FIG.6

METHOD AND ELECTRONIC DEVICE FOR SECURE MAGNETIC PULSE TRANSMISSION

CLAIM OF PRIORITY

This application claims the benefit under 35 U.S.C. § 119(a) of a Korean patent application filed on Jan. 3, 2017 in the Korean Intellectual Property Office and assigned Serial number 10-2017-0000602, the entire disclosure of which is hereby incorporated by reference.

TECHNICAL FIELD

The present disclosure relates to a method and an electronic device for secure magnetic pulse transmissions.

BACKGROUND

As an information technology (IT) is developed, an electronic device has been rapidly implemented with high functionality to provide a user with various functions. The electronic device may provide a user with a multimedia service, for example, a network-based communication service such as a music service, a video service, or a digital broadcast service, a call service, or a wireless Internet service.

Recently, "fin-tech" has been prominent, this being a combination of financial transactions and information technology systems. Fin-tech is considered as a paradigm shift in finance, and has continually expanded in scope thereof, ranging from conventional on-line financial services to off-line financial services and financial platform services.

For example, manufacturers of electronic devices cooperate with credit card companies or banks in multilateral efforts in implementing mobile payment platforms and spreading mobile payment services and advanced mobile banking services.

These efforts typically involve short range transmission of secured digital information. For example, in implementing the mobile payment services, the electronic device may be installed with a magnetic stripe transmission or magnetic secure transmission (MST) module. The electronic device may complete a payment transaction together with a conventional payment infrastructure (e.g., a point of sale "POS" terminal provided in a credit card affiliate) by using the MST module.

SUMMARY

The MST module may radiate, based on payment data acquired through various routes, a magnetic pulse having the form resembling the fluctuation of a magnetic field generated from the swipe operation of a real card. However, for example, numerous POS terminals may be manufactured by various manufacturers. The manufacturers may employ various receive patterns for the POS terminals to increase the rate of recognizing a magnetic pulse signal. Accordingly, when performing mobile a payment transaction, the electronic device sequentially transmits magnetic pulses in various radiation patterns having various formats to perform the payment transaction together with the numerous POS terminals.

However, when the electronic device sequentially transmits the magnetic pulses in n radiation patterns, the receive radiation pattern applied to a real POS terminal may correspond to an nth radiation pattern. In this case, before the MST module transmits the magnetic pulses in the $n^{th}$ radiation pattern, the operations of transmitting the magnetic pulses in (n−1) radiation patterns by the MST module may be meaningless and the time taken or power consumption to transmit the magnetic pulses in (n−1) radiation patterns may degrade the efficiency of the payment transaction.

Aspects of the present disclosure are to address at least the above-mentioned problems and to provide at least the benefits described below. Accordingly, an aspect of the present disclosure is to provide a method for mobile payment, capable of determining and collecting a radiation pattern used in a payment transaction, which is to be performed together with a real POS terminal, and of performing the payment transaction based on the collected radiation pattern, and an electronic device for performing the same.

In accordance with an aspect of the present disclosure, an electronic device includes a communication circuit configured to communicate with a server, a magnetic stripe transmission (MST) module configured to radiate a magnetic pulse communicating the secure data, and a processor electrically connected with the memory, the communication circuit, and the MST module, wherein the processor is configured to control the MST module to change an emitted radiation pattern of the magnetic pulse in prespecified order to iteratively emit the plurality of radiation patterns, in response to detecting a prespecified event, select a presently emitted radiation pattern of the magnetic pulse, and store information corresponding to the selected radiation pattern in the memory, or transmit the information corresponding to the selected radiation pattern to the server.

In accordance with another aspect of the present disclosure, an electronic device may include a memory configured to store secure data and a plurality of radiation patterns, a magnetic stripe transmission (MST) module configured to radiate a magnetic pulse communicating the secure data, a processor electrically connected with the memory and the MST module, wherein the processor is configured to acquire information associated with an e xternal device receiving the magnetic pulse, select at least one radiation pattern correlating with the acquired information associated with the external device, the least one radiation pattern selected from among the plurality of radiation patterns, and control the MST module to radiate the magnetic pulse in the selected radiation pattern to communicate the secure data to the external device.

According to embodiments disclosed in the present disclosure, an electronic device and/or a mobile payment service server may collect radiation patterns employed for external devices (e.g., POS terminals) in response to a specified event. Since the correlation between the external device and the radiation pattern is stored in the electronic device or the server, a plurality of electronic devices may select the optimal radiation pattern whenever performing the payment transaction. Further, since the optimal radiation pattern may be radiated prior to the other radiation patterns, time utilized in the mobile payment transaction and power consumption in the mobile payment transaction may be reduced. Besides, a variety of effects directly or indirectly understood through the present disclosure may be provided.

Other aspects, benefits, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and benefits of certain embodiments of the present disclosure will be more apparent from the following description taken in conjunction with the accompanying drawings, in which:

FIG. 6 is a view illustrating a plurality of radiation patterns, according to various embodiments;

Throughout the drawings, it should be noted that like reference numbers are used to depict the same or similar elements, features, and structures.

DETAILED DESCRIPTION

Figure 1:
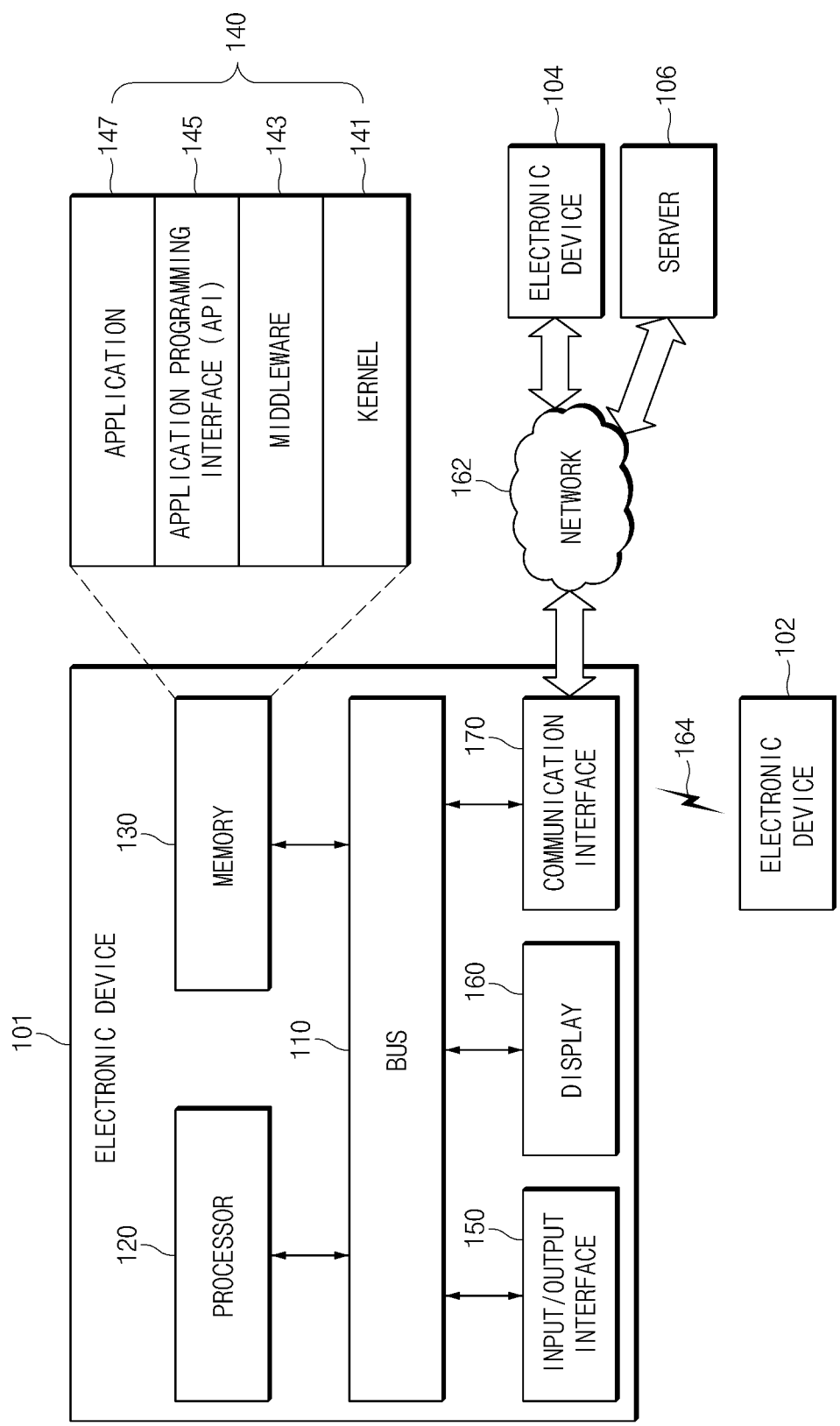
FIG. 1 is a block diagram illustrating an electronic device, according to various embodiments.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing from the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates an electronic device, according to various embodiments.

Referring to FIG. 1, according to various embodiments, an electronic device 101, 102, or 104, or a server 106 may be connected with each other over a network 162 or local wireless communication 164. The electronic device 101 may include a bus 110, a processor 120, a memory 130, an input/output interface 150, a display 160, and a communication interface 170. According to an embodiment, the electronic device 101 may not include at least one of the above-described elements or may further include other element(s).

For example, the bus 110 may interconnect the above-described elements 110 to 170 and may include a circuit for conveying communications (e.g., a control message and/or data) among the above-described elements.

The processor 120 may include one or more of a central processing unit (CPU), an application processor (AP), or a communication processor (CP). For example, the processor 120 may perform an arithmetic operation or data processing associated with control and/or communication of at least other elements of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data.

Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, an interface which transmits an instruction or data input from a user or another external device, to other element(s) of the electronic device 101. Furthermore, the input/output interface 150 may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first external electronic device 102, the second external electronic device 104, or the server 106). For example, the communication interface 170 may be connected to the network 162 over wireless communication or wired communication to communicate with the external device (e.g., the second external electronic device 104 or the server 106).

The wireless communication may include cellular communication using at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. According to an embodiment, the wireless communication may include at least one of wireless fidelity (Wi-Fi), Bluetooth, Bluetooth low energy (BLE), Zigbee, near field communication (NFC), magnetic secure transmission, magnetic stripe transmission (MST), radio frequency, a body area network (BAN), a global navigation satellite system (GNSS), or the like.

The magnetic secure transmission or the magnetic stripe transmission may generate a pulse in response to transmission data, and the pulse may generate a magnetic field signal. The electronic device 101 may transfer the magnetic field signal to point of sale (POS). The POS may detect the magnetic field signal using a magnetic strip reader (MSR) or a magnetic secure reader (MSR) and may recover the data by converting the detected magnetic field signal to an electrical signal. In this disclosure, "MST" may mean magnetic secure transmission or magnetic stripe transmission.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to an embodiment, the server 106 may include a group of one or more servers.

According to various embodiments, the server 106 may include a mobile payment service server and/or a payment server of a credit card company and/or a financial institution for implementing a mobile payment service in the electronic device 101. For example, the mobile payment service server may include a server (e.g., a token service provider (TSP)) for managing a token related to a payment application). In addition, for example, the payment server of the credit card company (and/or the financial institution) may include a server (e.g., a trusted service manager (TSM) server) for managing a financial account of a user According to an embodiment, the mobile payment service server may interact with the payment server of the credit card company (and/or the financial institution), thereby providing the electronic device 101 with payment information (referred to as "payment data"; for example, one-time token (OTT)) every payment transaction. The electronic device 101 may transmit the provided payment information to the external device 102 or 104 (e.g., a POS terminal) through various channels (e.g., an MST channel, an NFC channel, and the like) after being subject to specified security authentication. The external device 102 or 104 may transmit the payment information to the payment server of the credit card company (and/or a financial institution) and may be approved for payment to complete the subject payment transaction.

According to an embodiment, a security authentication policy applied to various cards may be determined by the credit card company and/or the financial institution (an example of a card issuer). Information (or data) including the security authentication policy for various payment cards may be transmitted to the electronic device 101 by the mobile payment service server and/or the credit card company (and/or the financial institution).

According to various embodiments, all or a portion of operations that the electronic device 101 will perform may be executed by another or plural electronic devices (e.g., the electronic device 102, 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 at other device (e.g., the electronic device 102 or 104 or the server 106). The other electronic device may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
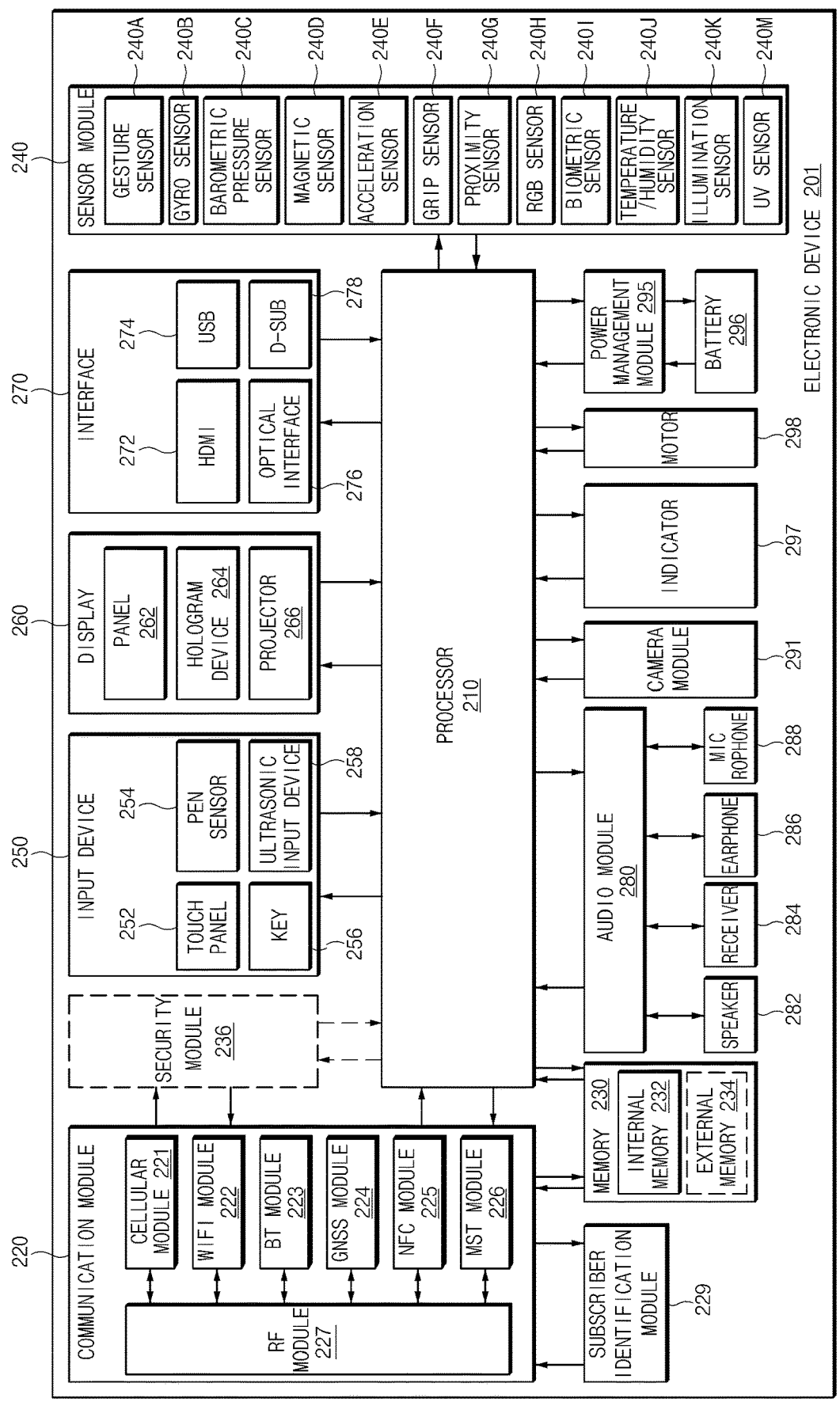
FIG. 2 is a block diagram illustrating an electronic device according to various embodiments.

FIG. 2 illustrates a block diagram of an electronic device, according to various embodiments.

Referring to FIG. 2, an electronic device 201 may include, for example, all or a part of the electronic device 101 illustrated in FIG. 1. The electronic device 201 may include one or more processors (e.g., an application processor (AP)) 210, a communication module 220, a subscriber identification module 229, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system (OS) or an application to control a plurality of hardware or software elements connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of elements illustrated in FIG. 2. The processor 210 may load an instruction or data, which is received from at least one of other elements (e.g., a nonvolatile memory), into a volatile memory and process the loaded instruction or data. The processor 210 may store a variety of data in the nonvolatile memory.

The communication module 220 may be configured the same as or similar to the communication interface 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226 and a radio frequency (RF) module 227.

The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 229.

According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, or the MST module 226 may be included within one Integrated Circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on Java card open platform (JCOP) OS.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue "RGB" sensor), a biometric sensor 240I, a temperature/humidity sensor 240J, an illuminance sensor 240K, or an UV sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, or a keypad. The ultrasonic input unit 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. For example, the screen may be arranged in the inside or the outside of the electronic device 201. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 170 illustrated in FIG. 1. Additionally or generally, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFLO™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 3:
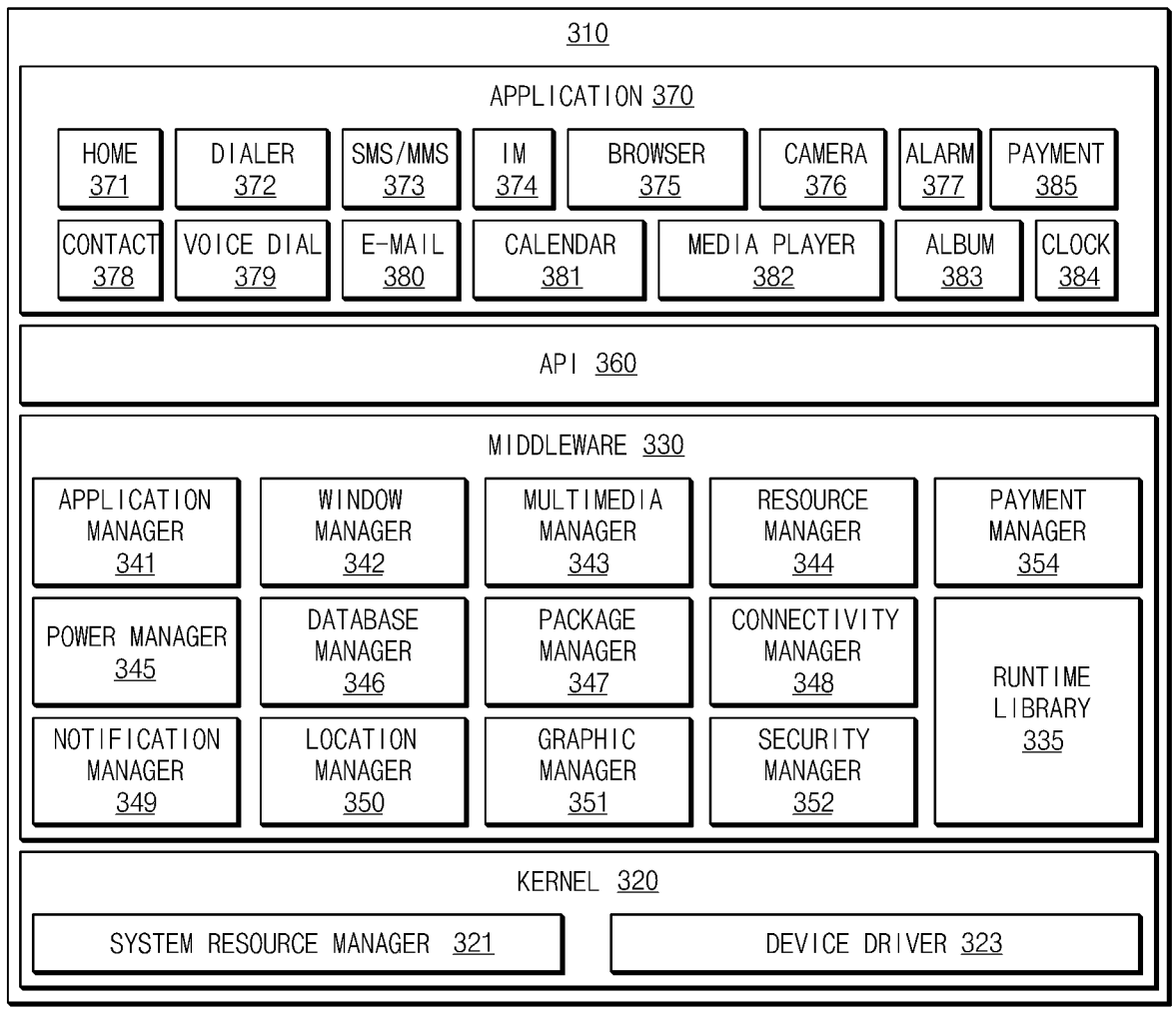
FIG. 3 is a block diagram illustrating a program module, according to various embodiments.

FIG. 3 illustrates a block diagram of a program module, according to various embodiments.

According to an embodiment, a program module 310 (e.g., the program 140) may include an operating system (OS) to control resources associated with an electronic device (e.g., the electronic device 101), and/or diverse applications (e.g., the application program 147) driven on the OS. The OS may be, for example, Android, iOS, Windows, Symbian, Tizen, or Bada.

The program module 310 may include a kernel 320, a middleware 330, an application programming interface (API) 360, and/or an application 370. At least a portion of the program module 310 may be preloaded on an electronic device or may be downloadable from an external electronic device (e.g., the first electronic device 102, the second electronic device 104, the server 106, or the like).

The kernel 320 (e.g., the kernel 141) may include, for example, a system resource manager 321 or a device driver 323. The system resource manager 321 may control, allocate, or retrieve system resources. According to an embodiment, the system resource manager 321 may include a process managing unit, a memory managing unit, a file system managing unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager 354.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource that is used in a screen. The multimedia manager 343 may identify a format utilized for playing diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify database that is to be used in at least one application of the application 370. The package manager 347 may install or update an application that is distributed in the form of package file.

The connectivity manager 348 may manage, for example, wireless connection such as Wi-Fi or Bluetooth. The notification manager 349 may display or notify an event such as arrival message, appointment, or proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function utilized for system security, user authentication, or the like. According to an embodiment, in the case where an electronic device (e.g., the electronic device 101) includes a telephony function, the middleware 330 may further include a telephony manager for managing a voice or video call function of the electronic device.

The middleware 330 may include a middleware module that combines diverse functions of the above-described elements. The middleware 330 may provide a module specialized to each OS kind to provide differentiated functions.

Additionally, the middleware 330 may dynamically remove a part of the preexisting elements or may add new elements thereto.

The API 360 (e.g., the API 145) may be, for example, a set of programming functions and may be provided with a configuration that is variable depending on an OS. For example, in the case where an OS is the android or the iOS, it may provide one API set per platform. In the case where an OS is the Tizen, it may provide two or more API sets per platform.

The application 370 (e.g., the application program 147) may include, for example, one or more applications capable of providing functions for a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a timepiece 384, a payment 385, health care (e.g., measuring an exercise quantity, blood sugar, or the like) or offering of environment information (e.g., information of barometric pressure, humidity, temperature, or the like).

According to an embodiment, the application 370 may include an application (hereinafter referred to as "information exchanging application" for descriptive convenience) to support information exchange between an electronic device (e.g., the electronic device 101) and an external electronic device (e.g., the electronic device 102 or 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or 104). Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the electronic device 102 or 104) which communicates with the electronic device, an application running in the external electronic device, or a service (e.g., a call service, a message service, or the like) provided from the external electronic device.

According to an embodiment, the application 370 may include an application (e.g., a health care application of a mobile medical device) that is assigned in accordance with an attribute of an external electronic device (e.g., the electronic device 102 or 104). According to an embodiment, the application 370 may include an application that is received from an external electronic device (e.g., the server 106 or the electronic device 102 or 104). According to an embodiment, the application 370 may include a preloaded application or a third party application that is downloadable from a server. The names of elements of the program module 310 according to the embodiment may be modifiable depending on kinds of operating systems.

According to various embodiments, at least a portion of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, processes, or the like for performing one or more functions.

Figure 4:
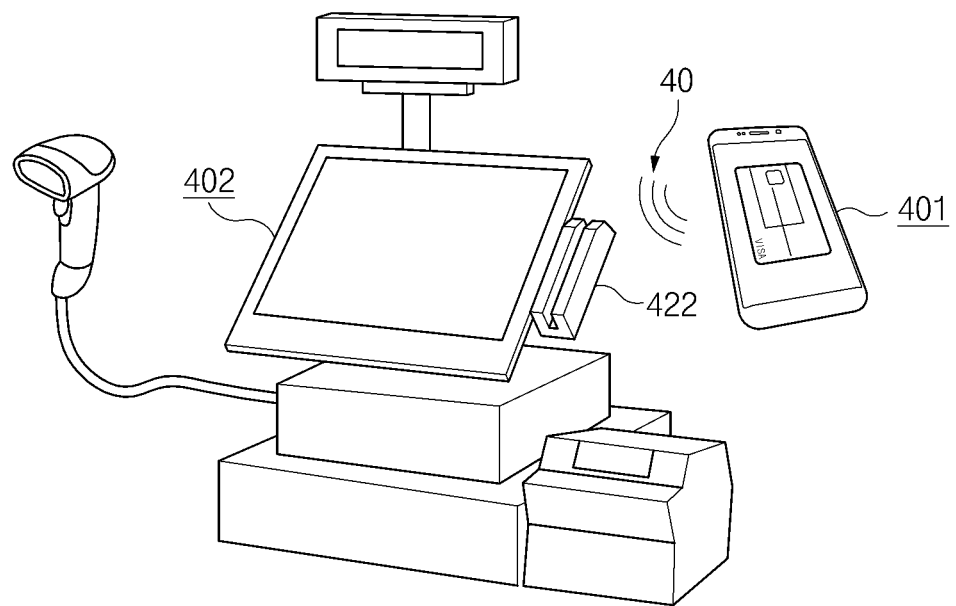
FIG. 4 is a view illustrating an environment in which a transaction is performed, according to various embodiments.

FIG. 4 is a view illustrating an environment in which a payment transaction is performed, according to various embodiments.

Referring to FIG. 4, according to an embodiment, an electronic device 401 may wirelessly interact with an external device 402. For example, the electronic device 401 may correspond to a smartphone including an MST module, and the external device 402 may correspond to a POS terminal including an MSR 422 corresponding to the MST module.

According to an embodiment, the electronic device 401 may communicate with the external device 402 through an MST channel. For example, a user may allow the electronic device 401 to closely approach the MSR 422 provided in the external device 402 by less than a specific distance (e.g., 1 cm to 5 cm). If the MST module coupled inside or outside the electronic device 401 is activated, the electronic device 401 may generate and radiate a magnetic field (e.g., a magnetic pulse) 40, which includes payment data and is modulated in a specific manner, through the activated MST module. The payment data may be transmitted to the external device 402 through the radiated magnetic field 40.

According to an embodiment, the external device 402 may complete a payment transaction based on the payment data included in the magnetic field 40. For example, the external device 402 may complete the payment transaction by interacting with a mobile payment service server and a payment server of a card company and/or a financial institution through an external network (e.g., a POS system network, the Internet, or the like).

Figure 5:
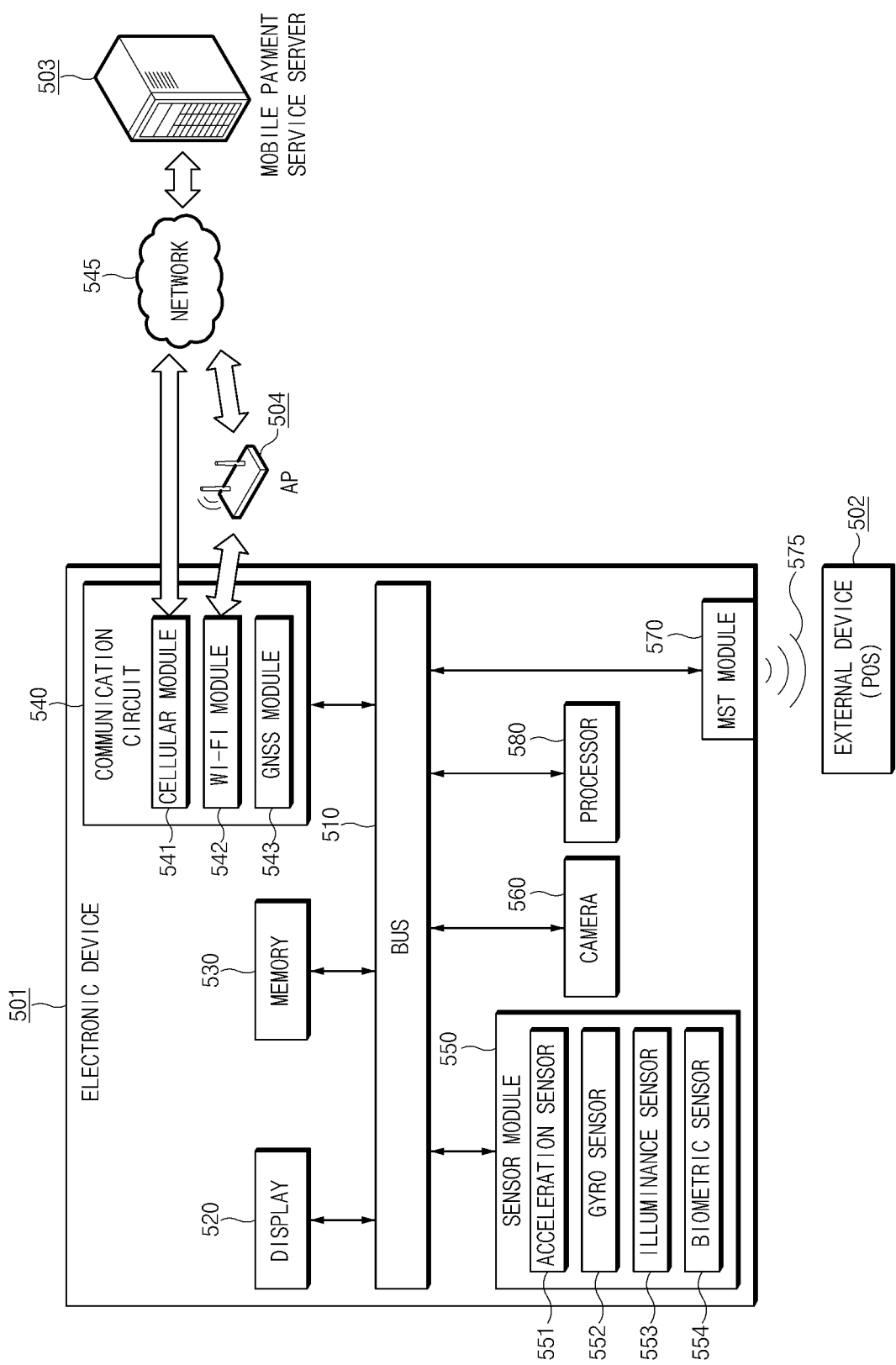
FIG. 5 is a block diagram illustrating an electronic device, according to an embodiment.

FIG. 5 is a block diagram illustrating an electronic device, according to an embodiment.

Referring to FIG. 5, according to an embodiment, an electronic device 501 may perform a payment and/or financial transaction together with an external device 502 (e.g., a POS terminal provided in a merchant, an ATM of a financial institution, or an electronic device allowing person-to-person payment or person-to-person transfer). The electronic device 501 may correspond to the electronic device 401 illustrated in FIG. 4, and the external device 502 may correspond to the external device 402 illustrated in FIG. 4.

According to an embodiment, the electronic device 501 may include, for example, a bus 510, a display 520, a memory 530, a communication circuit 540, a sensor module 550, a camera 560, an MST module 570, and/or a processor 580. According to various embodiments, the electronic device 501 may not include some of elements illustrated in FIG. 5, and may additionally include an element which is not illustrated in FIG. 5.

The bus 510 may electrically connect the elements 520 to 580 of the electronic device 501 with each other. The bus 510 may include a circuit which transmits a communication message (e.g., a control message and/or data) among the above elements.

The display 520 (e.g., the display 260 of FIG. 2) may display various contents (e.g., a text, an image, a video, an icon, an object, or a symbol) under the control of the processor 580. The display 520 may include a touch screen and may receive, for example, a touch, gesture, proximity, or hovering input using an electronic pen or a part of a body of the user. The display 520 may output a graphic user interface (GUI) based on various types of software (e.g., a payment application or the like), and may acquire a user input through the GUI.

The memory 530 (e.g., the memory 230 of FIG. 2) may store an instruction, information, program or data associated with the operations of the elements 520, and 540 to 580 included in the electronic device 501. For example, the memory 530 may store a payment application and data (e.g., payment data, radiation patterns (e.g., see FIG. 6), information (e.g., see FIG. 7) including the correlation between the radiation pattern and the external device, or the like) utilized for the operations of the elements.

In addition, for example, the memory 530 may store instructions allowing the processor 580 to perform various operations (e.g., FIG. 8 and FIG. 11) disclosed in the present disclosure when executed. For example, the instructions are implemented by software, such as an application program, an operating system (OS), or firmware to be stored in the memory 530 or may be embedded in hardware.

According to various embodiments, the memory 530 may include a security module (e.g., the security module 236 of FIG. 2). The security module may store payment data. For example, the payment data may include at least one of a primary account number (PAN), in which at least a portion of the payment card is encrypted, a valid time of the payment card, a card verification value (CVV) of the payment card, or a token in which at least a portion of the payment card is encrypted.

According to an embodiment, the security module may be implemented, for example, in the form of a secure element (SE), an embedded SE (eSE), an universal IC card (UICC), an embedded UICC (eUICC), a micro secure digital (SD) card, a subscriber identification module (SIM) card, or a trust zone which is a storage place (or a memory) safely protected from an unauthorized access.

The communication circuit 540 (e.g., the communication module 220 of FIG. 2) may make communication with a mobile payment service server 503 and a server involved in other payment transactions. For example, the communication circuit 540 may include a cellular module 541, a Wi-Fi module 542, or a GNSS module 543.

The cellular module 541 may be connected with a network 545 based on a cellular communication protocol such as a long term evolution (LTE), an LET-advance (LTE-A), a code division multiple access (CDMA), or a global system for mobile communication (GSM). The Wi-Fi module 542 may be connected with an access point (application) 504 provided around the electronic device 501 to access the network 545. The electronic device 501 may communicate with the mobile payment service server 503 and other servers involved in other payment transactions by using the cellular module 541 and/or the Wi-Fi module 542. A GNSS module 543 may acquire the location information (e.g., a latitude and a longitude) of the electronic device 501 from a relevant satellite. According to various embodiments, the electronic device 501 may acquire (or estimate) the location information through a triangulation method based on signals of base stations connected with the electronic device 501 through the cellular module 541 or location information of the AP 504 connected with the Wi-Fi module 542.

The sensor module 550 may measure or detect a physical quantity acquired from an inner part of the electronic device 501 or a surrounding of the electronic device 501, thereby converting the physical quantity into the electrical signal. According to an embodiment, the sensor module 550 may include an acceleration sensor (or an accelerometer) 551, a gyro sensor (or a gyroscope) 552, an illuminance sensor 553, and a biometric sensor 554. According to various embodiments, the sensor module 550 may further include various sensor modules similarly to the sensor module 240 of FIG. 2.

The gyro sensor 552 (e.g., the gyro sensor 260B of FIG. 2) may detect the posture of the electronic device 501 and the acceleration sensor 551 (e.g., the acceleration sensor 240E of FIG. 2) may detect the moving speed of the electronic device 501. For example, the gyro sensor 552 and/or the acceleration sensor 551 may detect the posture of the electronic device 501 and/or the direction in which the electronic device 501 is moved by external force applied thereto, in a three dimension (3D) space.

The illuminance sensor 553 (e.g., the illuminance sensor 260K of FIG. 2) may detect the quantity of light around the electronic device 501. For example, the illuminance sensor 553 may be implemented by using a photo resistor (e.g., a cadmium sulfide cell) having a resistance value varied with the quantity of light. The processor 580 may receive information on the illuminance (or the quantity of light) around the electronic device 501 based on the resistance value varied in the photo resistor of the illuminance sensor 553.

The biometric sensor 554 (e.g., a biometric sensor 240I) may detect a biometric feature originated from the body of the user or may receive the input of the biometric feature. In detail, the biometric sensor 554 may detect the biometric feature, may convert the biometric feature into a digital value, and may provide the converted digital value to the processor 580. The processor 580 may compare the converted digital value with an authorization value registered in the memory 530. The processor 580 may authenticate a legitimate user based on the comparison result. According to various embodiments, the comparison and the user authentication may be performed by using computing resources of a driver IC embedded in the biometric sensor 554. According to an embodiment, the biometric sensor 554 may include a sensor such as a fingerprint sensor, an iris sensor, or a vein sensor.

The camera 560 may capture a surrounding image of the electronic device 501 based on light incident to the camera 560 from the outside. For example, the camera may include a lens for condensing the incident light, an image sensor for converting the incident light into an electrical signal through photoelectric conversion, and an image signal processor (ISP) for processing image data generated depending on the electrical signal.

The MST module 570 (e.g., the MST module 226 of FIG. 2) may radiate a magnetic pulse corresponding to secure digital data (e.g., such as payment information) in a pre-specified radiation pattern. For example, the MST module 570 may include an MST controller (or an MST driver) and an inductor driven by the MST controller. The MST controller may convert the secure digital data into the electrical signal to be transmitted to the inductor. The inductor may generate, for example, a magnetic field fluctuation (magnetic pulse) modulated in the specified radiation pattern, based on the electrical signal received from the MST controller. The secure digital data may thus be transmitted to the external device 502 using the magnetic pulse 575.

Although FIG. 5 illustrates that the MST module 570 is embedded in the electronic device 501, the MST module 570 may be implemented by using a dedicated device (or a dedicated accessory) and may be electrically connected with the electronic device 501 through a specified interface (e.g., a 3.5 mm earphone terminal or a USB receptacle) according to various embodiments.

For example, the processor 580 (e.g., the processor 210 of FIG. 2) may be electrically connected with the elements 510 to 570 included in the electronic device 501 through the bus 510 and may execute operations or data processing for control and/or communication of the elements 510 to 570 included in the electronic device 501.

According to an embodiment, the processor 580 may execute or launch a payment application (e.g., Samsung Pay™). A specified execution screen (a specified activity screen according to the execution of the application), that is, a GUI screen may be output to the display 520.

After executing the above payment application, the processor 580 may collect information associated with the external device 502 and/or radiation patterns used in the payment transaction together with the external device 502 depending on the following operations.

According to an embodiment, the processor 580 may receive a user input (e.g., the selection of the payment card) to the GUI screen of the payment application and may perform user authentication (e.g., user authentication using the biometric sensor 554). If a user is successfully authenticated, the processor 580 may radiate a magnetic pulse, which corresponds to the payment data, in any one of a plurality of radiation patterns stored in the memory 530.

In this connection, referring to FIG. 6, a plurality of radiation patterns 601 to 622 are illustrated according to an embodiment. At least a portion of the radiation patterns 601 to 622 stored in the memory 530 may be radiation patterns provided from the mobile payment service server 503. At least some of the radiation patterns may be radiation patterns collected through the operation of the electronic device 501. In addition, at least a portion of radiation patterns may be preset or previously stored in the product shipment of the electronic device 501. Although FIG. 6 illustrates 22 radiation patterns 601 to 622, the number of radiation patterns to be stored in the memory 530 may be not limited thereto. For example, the number of the radiation patterns may be smaller than or larger than 22.

The processor 580 of the electronic device may radiate a magnetic pulse corresponding to the secure digital data in a radiation pattern (P1) 601 when the user is successfully authenticated. Radiation of the magnetic pulse with respect to any one radiation pattern is not limited to a single transmission. For example, any one of the radiation patterns may be radiated at least twice, or more as the circumstances require.

According to the radiation pattern (P1) 601, the secure digital data is converted into the format corresponding to 'track 2' of a real card having a magnetic stripe. A baud rate is set to 200 and the number of '0s' to be (i.e., lead zeros) transmitted before the transmission of the secure digital data is set to 30. Further, the number of '0s' (i.e., tail zeros) to be transmitted after the secure digital data is transmitted is set to 15. After the magnetic pulse corresponding to the secure digital data is radiated in the above pattern, the magnetic pulse may be reversely re-transmitted without a specific delay time (delay='0'). In other words, the payment data is converted into the format corresponding to 'track 2', and the baud rate of the magnetic pulse is set to 200. The number of '0s', which are to be transmitted before the secure digital data is transmitted and the number of '0s', which are to be transmitted after the payment data is transmitted, are 15 and 30, respectively.

According to an embodiment, the processor 580 may control the MST module 570 to change the radiation pattern of the magnetic pulse in a specified order or sequence based on the radiation patterns (e.g., reference numerals 601 to 622 of FIG. 6).

For example, referring to FIG. 6, after radiating the magnetic pulse through the MST module 570 in the radiation pattern (P1) 601, for example, after 950 ms has been elapsed (the delay time in P1='950'), the processor 580 may radiate the magnetic pulse in a radiation pattern (P2) 602.

According to the radiation pattern (P2) 602, the secure digital data is converted into the format corresponding to 'track 2' of a real card. A baud rate is set to 800 and the number of '0s' (i.e., lead zeros), which are to be transmitted before the transmission of the secure digital data, is set to 30. Further, the number of '0s' (i.e., tail zeros) to be transmitted after the secure digital data is transmitted is set to 30. After the magnetic pulse is radiated in the above radiation pattern (P2) 602, for example, after 950 ms has been elapsed (delay='950' in P2), the magnetic pulse may be radiated in the next radiation pattern 'P3'.

Thereafter, if the radiation patterns are sequentially changed and the magnetic pulse is radiated in the radiation pattern (P22) 622, the magnetic pulse may be radiated again in the radiation pattern (P1) 601. Although the radiation patterns (P1) 601 to (P22) 622 are sequentially radiated for the convenience of explanation, the radiation patterns may be radiated in various orders as illustrated in FIGS. 12A to 12E.

According to an embodiment, the processor 580 may determine (or specify) a radiation pattern of a magnetic pulse which is being radiated through the MST module 570, in response to a specified event. For example, if the specified event occurs while the magnetic pulse corresponding to the secure digital data is being radiated in the radiation pattern (P2) 602 illustrated in FIG. 6, the processor 580 may determine the radiation pattern, which is radiated at a time point at which the specified event occurs, to be the second radiation pattern (P2) 602.

Accordingly, the specified event may be derived from the operation (e.g., an operation of retrieving the electronic device 501 placed around the external device 502) of rapidly moving the electronic device 501 by the user after the payment transaction is successfully achieved. In detail, the specified event may be detected by the sensor module 550 included in the electronic device 501.

For example, the specified event may include the change exceeding the specified range in the acceleration, which is detected by the acceleration sensor 551 and/or the gyro sensor 552, the change exceeding the specified range of the parameter (e.g., brightness), which represents the photographing condition for the image captured by the camera 560, or the change exceeding the specified range in the quantity of light which is detected by the illuminance sensor 553. The radiation pattern determined in response to the event may be presumed as a radiation pattern used in the real payment transaction.

A plurality of specified events may occur depending on the use aspects of the user. For example, if the payment transaction is failed after starting radiating the magnetic pulse at the initial stage, the user may frequently make the electronic device 501 close to an MSR of the external device 502 or may frequently separate the electronic device 501 from the MSR. To this end, according to an embodiment, the processor 580 may update information on the radiation pattern whenever the specified event occurs and may determine the updated radiation pattern in response to an event of representing the termination of the payment transaction.

For example, in the case that the user makes the electronic device 501 close to the MSR of the external device 502 and separates the electronic device 501 from the external device 502 (a primary event occurs), the processor 580 of the electronic device 501 may determine the radiation pattern (P15). In the case that the user makes the electronic device 501 close to the MSR of the external device 502 and separates the electronic device 501 from the external device 502 as the payment transaction is failed (a secondary event occurs), the processor 580 of the electronic device 501 may determine the radiation pattern (P16). In this case, the processor 580 may update the radiation pattern P15, which is determined when the primary event occurs, to the radiation pattern P16 which is determined when the secondary event occurs. Thereafter, if an event of representing the termination of the payment transaction occurs, the processor 580 may determine the updated radiation pattern P16, may store the information on the radiation pattern P16 in the memory 530, or may transmit the radiation pattern P16 to the mobile payment service server 503.

The event of representing the termination of the payment transaction may include, for example, the reception of a message (e.g., a message of approving a transaction by an SMS/MMS) representing the completion of the payment transaction, a user input (e.g., the selection of a soft key for representing the stopping of the radiation by the user) for stopping the radiation of the magnetic pulse, or the elapse of specified radiation time (e.g., 2 minutes).

According to various embodiments, the processor 580 may determine (or specify) at least two radiation patterns when identifying the radiation pattern of the magnetic pulse, by considering the error between the time point, at which the specified event is detected, and a time point at which the radiation pattern of the MST module 570 is determined. For example, the promising radiation pattern may be dedicated as a primary radiation pattern and the next promising radiation pattern may be dedicated as a secondary radiation pattern. For example, when the radiation pattern (P2) 602 illustrated in FIG. 6 is dedicated as the primary radiation pattern, the radiation pattern (P1) 601, which is an adjacent radiation pattern, may be dedicated as a secondary radiation pattern.

According to an embodiment, the processor 580 may store the information on the radiation pattern, which is determined in response to the specified event, in the memory 530 or may transmit the information on the radiation pattern to the mobile payment service server 503. According to various embodiments, the processor 580 may acquire the information associated with the external device 502 having the received magnetic pulse, based on the determined radiation pattern, and may make the information on the determined radiation pattern correlating with the information on the external device. Thereafter, the processor 580 may store the correlation information in the memory 530 or may transmit the correlation information to the mobile payment service server 503.

Figure 7:
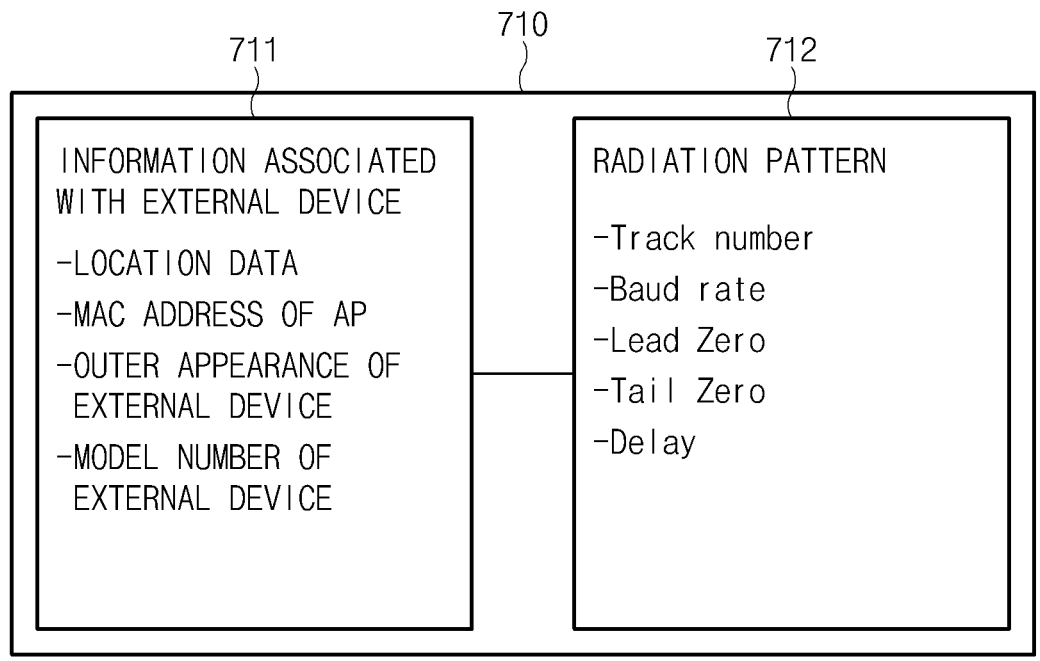
FIG. 7 is a view illustrating correlation made between an external device and a radiation pattern, according to an embodiment.

FIG. 7 illustrates the correlation between information 711 associated with the external device 502 and information 712 on the radiation pattern.

The information 711 associated with the external device 502 may include at least one of location information acquired from the GNSS module 543, identification information (e.g., a MAC address) of the AP 504 connected with the external device 502 through the Wi-Fi module 542, identification information (e.g., a model name, a serial number, or the like), or an outer appearance of the external device 502 collected from the image captured by the camera 560.

The information 712 on the radiation pattern determined in response to the specified event may include a track number, into which the secure digital data is converted, a baud rate of the secure digital data to be transmitted through the magnetic pulse, the number of '0s' (i.e., lead zeros) to be transmitted through the magnetic pulse before the secure digital data is transmitted, the number of '0s' (i.e., tail zeros) to be transmitted after the secure digital data is transmitted, and a delay time until the transmission of the subsequent magnetic pulse is started. According to various embodiments, the information 712 on the radiation pattern may include information on the transmission order (e.g., forward/reverse) of the secure digital data to be transmitted through the magnetic pulse (see P1 601 of FIG. 6).

In the case that the information 711 associated with the external device 502 and information 712 on the radiation pattern used by the external device 502 have the correlation therebetween, the information 711 and the information 712 may be handled as a single piece of information (or data) 710. The correlation information 710 may be stored, for example, in the memory 530 or may be transmitted to the mobile payment service server 503 through the communication circuit 540.

Accordingly, for example, if the radiation pattern (P2) 602 illustrated in FIG. 6 is determined to be used in the information transaction together with a POS terminal #1 (an example of the external device 502), the information associated with the POS terminal #1 and the information on the radiation pattern (P2) 602 may be correlated therebetween and may be handled as a single piece of information.

Meanwhile, the electronic device 501 may select a radiation pattern correlated with the external device 502 and may radiate a magnetic pulse based on the radiation pattern, according to the operation of the processor 580.

According to an embodiment, the processor 580 may acquire information associated with the external device which receives the magnetic pulse. In other words, the processor 580 may acquire information associated with the external device 502 subject to the payment transaction together with the electronic device 501. As described above, the information associated with the external device 502 may include at least one of location information acquired from the GNSS module 543, identification information (e.g., a MAC address) of an AP 504 connected with the external device 502 through the Wi-Fi module 542, or identification information or an outer appearance of the external device 502 collected from the image captured by the camera 560.

According to an embodiment, the processor 580 may select at least one radiation pattern, which is associated with the acquired information associated with the external device 502, among a plurality of radiation patterns stored in the memory 530. The correlation may be previously stored in the memory 530. If the radiation pattern correlated with the acquired information associated with the external device 502 is absent, the processor 580 may request and receive relevant information from the mobile payment service server 503 through the communication circuit 540.

According to an embodiment, the processor 580 may control the MST module 570 to radiate a magnetic pulse, which corresponds to the secure digital data, in the selected at least one radiation pattern.

Figure 12A:
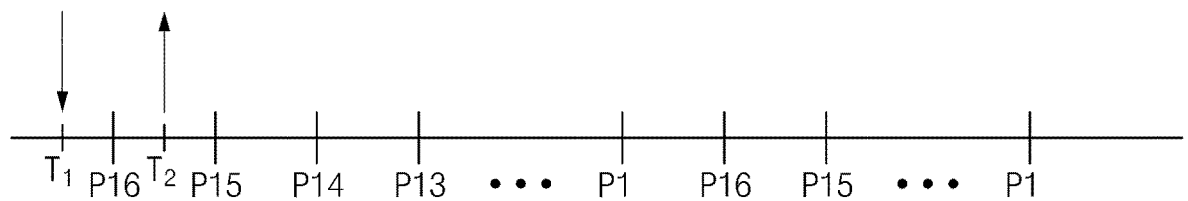
FIG. 12A, FIG. 12B, FIG. 12C, FIG. 12D, and FIG. 12E are views illustrating the order of changing a radiation pattern, according to various embodiments.
Figure 12B:
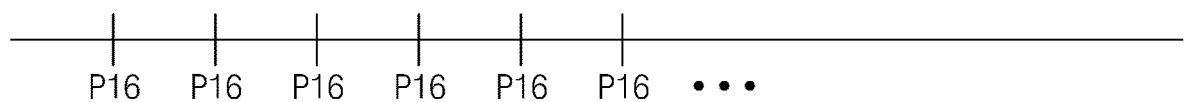

For example, the processor 580 may repeatedly radiate the magnetic pulse in the selected radiation pattern (see FIG. 12B). In the case that two radiation patterns are selected, the processor 580 may control the MST module 570 to alternately radiate the magnetic pulse in a primary radiation pattern and a secondary radiation pattern.

For another example, the processor 580 may control the MST module 570 to radiate a magnetic pulse in the selected radiation pattern and may sequentially radiate magnetic pulses in the remaining radiation patterns which are not selected among the radiation patterns stored in the memory 530 (see FIG. 12A).

For another example, in the case that two radiation patterns are selected, the processor 580 may control the MST module 570 to radiate a magnetic pulse in the primary radiation pattern by the first specified number of times and subsequently radiate the magnetic pulse in the second radiation pattern by the second specified number of times (see FIGS. 12C and 12D).

The operation of the processor 580 is provided for the illustrative purpose, and the present disclosure is not limited thereto. In details, the operations of a processor, which have been described in other parts of the present specification, will be understood as the operations of the processor 580. In addition, at least some of operations described as operations of the electronic device in the specification may be understood as the operations of the processor 580.

For example, the external device 502 may include a POS terminal provided at a credit card affiliate, an ATM of a financial institution, or an electronic device allowing person-to-person payment or person-to-person transfer. The external device 502 may include the MSR corresponding to the MST module 570 of the electronic device 501. Although not illustrated in FIG. 5, the external device 502 may include a communication circuit to access the network 545, a processor, which is used to process various financial transactions, or the like. For example, the external device 502 may restore a magnetic pulse, which is generated by the MST module 570 of the electronic device 501, as payment data (electrical signal) and may progress and complete the financial transaction based on the payment data.

Figure 8:
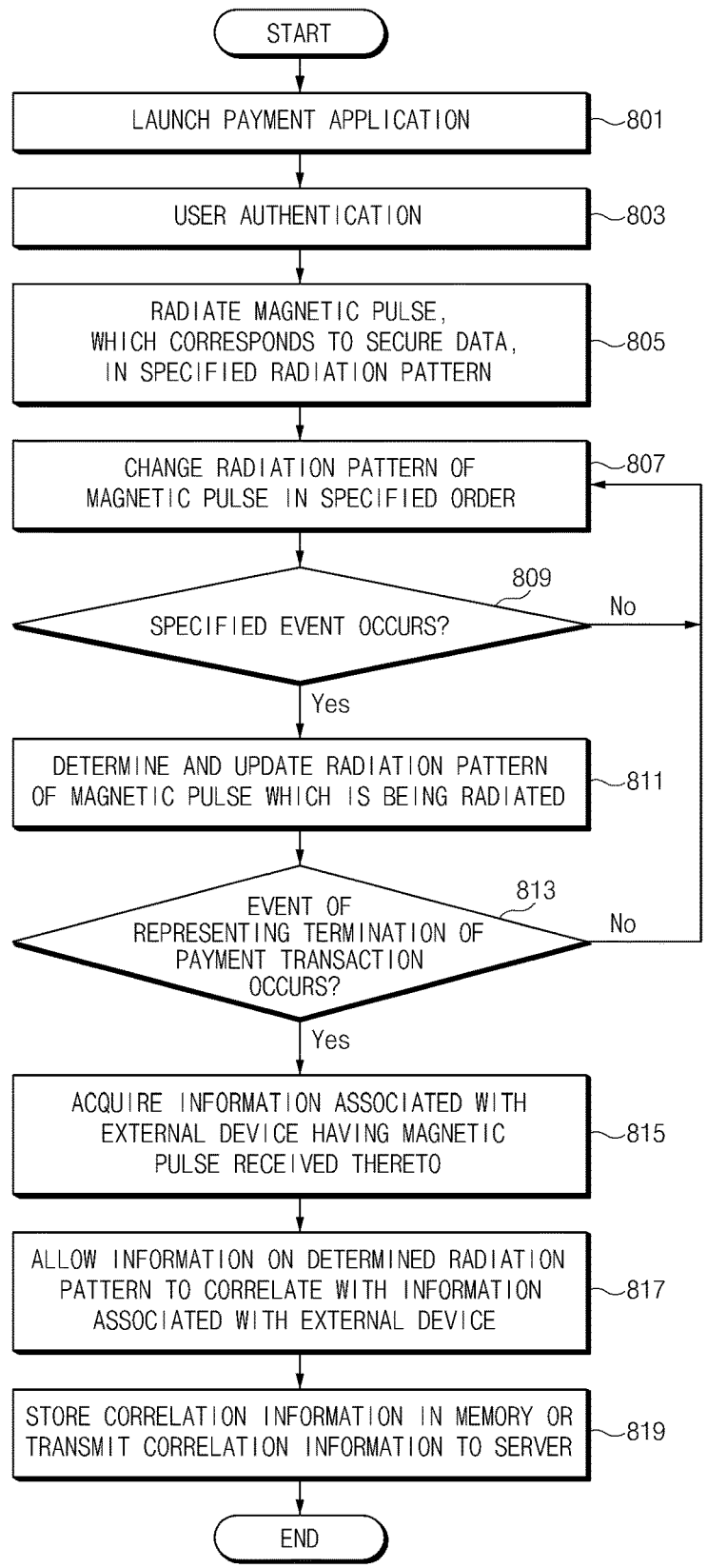
FIG. 8 is a flowchart illustrating a method for mobile payment, according to an embodiment.

FIG. 8 is a flowchart illustrating a method for mobile payment, according to an embodiment.

Referring to FIG. 8, according to an embodiment, a method for secure transmission of data via magnetic pulse may include operations 801 to 819. For example, operations 801 to 819 may be performed by the electronic device 501 illustrated in FIG. 5. Each of operations 801 to 819 may be implemented with instructions performed (or executed) by the processor 580 of the electronic device 501. The instructions may be, for example, stored in a computer-readable recording medium or the memory 530 of the electronic device 501 illustrated in FIG. 5. Hereinafter, reference numerals of FIG. 5 will be used in the following descriptions of operations 801 to 819.

In operation 801, the processor 580 of the electronic device 501 may execute or launch a secure data transmission application (e.g., a payment application such as Samsung Pay™). A specified GUI screen may be output to the display 520 in response to the execution of the application. In operation 801, a particular secure data element may be selected for transmission (such as information relating to a payment card for use in a payment transaction).

In operation 803, the processor 580 may perform user authentication. The user authentication may include user authentication based on the biometric sensor 554 or personal identification number (PIN) authentication through the GUI screen output to the display 520.

In operation 805, the processor 580 may radiate a magnetic pulse, which corresponds to the secure digital data, in a prespecified radiation pattern through the MST module 570. The secure digital data may include at least one of an identifier (e.g., such as a PAN), in which at least a portion of relevant user account information is encrypted (e.g., such as information disposed on a payment card), a time period in which the account information is valid (e.g., an expiry time), a verification value or a token (e.g., such as a CVV number).

In operation 807, the processor 580 may control the MST module 570 to change radiation patterns of the magnetic pulse in specified order, based on a plurality of radiation patterns (e.g., 601 to 622 of FIG. 2) pre-stored in the memory 530. Accordingly, the radiation pattern in operation 805 may be changed into a different radiation pattern.

In operation 809, the processor 580 may determine whether a specified event occurs. If the specified event occurs, the processor 580 may proceed to operation 811. Otherwise, the processor 580 may proceed to operation 807.

According to an embodiment, the specified event may include an success of the information transaction. For example, the specified event may include an operation in which a user rapidly moves the electronic device 501 after the information transaction is successfully completed (e.g., an operation that the user retrieves the electronic device 501 placed around the external device 502). For example, the specified event may be detected based on the motion, which is detected by the acceleration sensor 551 and/or the gyro sensor 552 and exceeds a specified range, a change exceeding the specified range of a parameter (e.g., brightness), which represents the capturing condition for an image obtained by the camera 560, or change exceeding a specified range in the quantity of light which is detected by the illuminance sensor 553.

In operation 811, the processor 580 may determine (or specify) the radiation pattern of the magnetic pulse which is being radiated through the MST module 570, in response to detecting occurrence of the specified event. According to an embodiment, in the case that the specified event occurs several times, the processor 580 may update the radiation pattern to a latest radiation pattern.

According to various embodiments, when identifying the radiation pattern of the magnetic pulse the processor 580 may determine (or specify) at least two radiation patterns by considering the error between a time point at which the specified event is detected, and a time point at which the radiation pattern of the MST module 570 is determined. For example, the radiation pattern most likely to achieve transaction successful detection may be selected as a primary radiation pattern and a secondary radiation pattern next most likely to achieve successful detection may be selected as a secondary radiation pattern.

In operation 813, the processor 580 may determine whether termination of the information transaction is detected. The processor 580 may determine the radiation pattern determined or updated in operation 811 in response to detecting termination of the information transaction and may proceed to operation 815. The processor 580 may return to operation 807 if the termination of the information transaction is not detected.

The event indicating the termination of the information transaction may include, for example, the reception of a message (e.g., an SMS/MMS message) indicating completion of the information transaction, the reception of a user input (e.g., the selection of a soft key for representing the stopping of the radiation by the user) of stopping the radiation of the magnetic pulse, or the elapse of a specified radiation time (e.g., 30 seconds to 2 minutes).

In operation 815, the processor 580 may acquire information associated with the external device that has already received the magnetic pulse. In other words, the processor 580 may acquire information associated with the external device 502, subject to the information transaction with the electronic device 501. The information associated with the external device 502 may include at least one of location information acquired from the GNSS module 543, identification information (e.g., a MAC address) of the AP 504 connected with the external device 502 through the Wi-Fi module 542, or identification information or an outer appearance of the external device 502 collected from the image captured by the camera.

In operation 817, the processor 580 may allow the radiation pattern determined in operation 813 to correlate with information associated with the external device 502 acquired in operation 815. The correlation information may be handled as a single piece of information (or data).

In operation 819, the processor 580 may store the correlation information, which is generated in operation 817, in the memory 530 or may transmit the correlation information to the service server 503 (e.g., a mobile payment service server) through the communication circuit 540.

Although operations 811 to 819 have been sequentially described in FIG. 8, the present disclosure is not limited to the sequence and some of the operations may be omitted. For example, operation 815 may be performed after operation 803 or 805, and operation 813 may be omitted or may be performed after operation 819 based on a user input.

Figure 9:
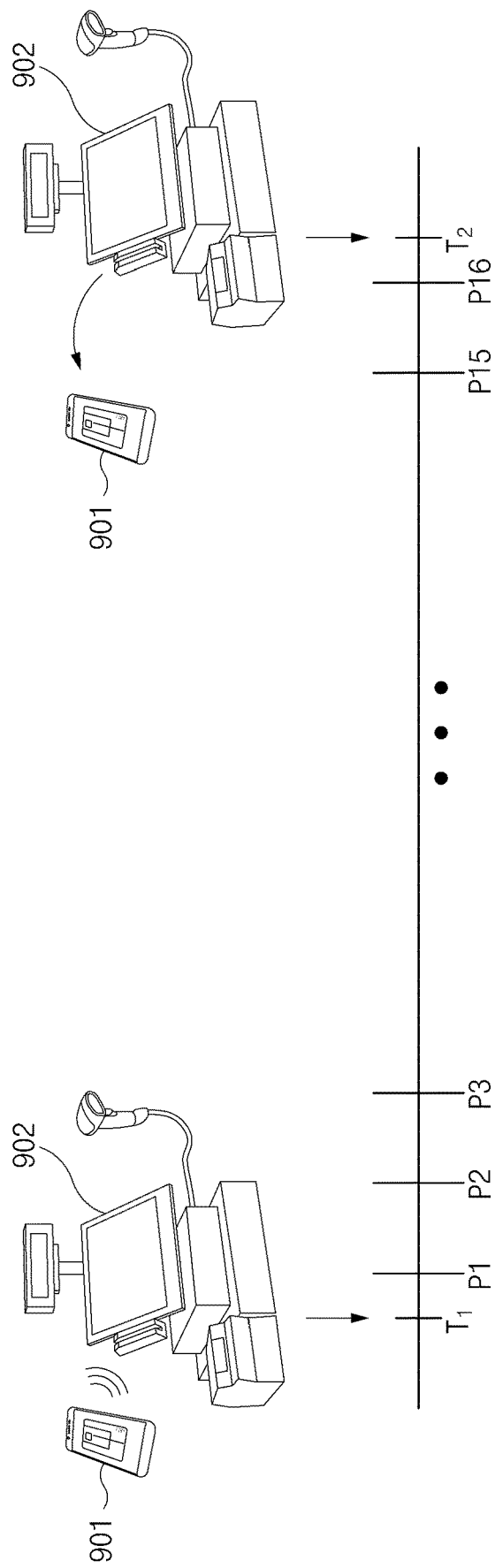
FIG. 9 is a view illustrating a method for collecting information on the radiation pattern, according to an embodiment.

FIG. 9 is a view illustrating a method of collecting secure digital information via the magnetic radiation pattern, according to an embodiment. In the present embodiment, the example utilized is an electronic exchange of secure payment information via a smartphone. However, it is understood the present invention is not limited to transactions of payment information, but is relevant to any secure information transacted.

Referring to FIG. 9, an electronic device 901 having an executing payment application (e.g., Samsung Pay™) may be disposed proximate to an MSR of a POS terminal 902. Thereafter, if user authentication is successfully performed, a magnetic pulse corresponding to the payment data may be radiated through the embedded MST module or an external MST module at a time point T1.

According to an embodiment, the electronic device 901 may radiate the magnetic pulse in the format of a radiation pattern P1 and then sequentially change a radiation pattern based on a plurality of radiation patterns P2 to P16.

For example, the POS terminal 902 may be designed to receive the magnetic pulse radiated in the format of a radiation pattern P16. Accordingly, when the electronic device 901 radiates the magnetic pulse corresponding to payment data in the format of the radiation pattern P16, the payment transaction may be achieved. If the payment transaction is successfully achieved, the user may retrieve the electronic device 901 placed proximate to the POS terminal 902 at the time point T2. The electronic device 901 may be rapidly moved by the user's action of retrieving the electronic device 901.

Accordingly, the electronic device 901 may detect an event of representing the success of the payment transaction. For example, a specified event may correspond to a motion which is detected by the acceleration sensor and/or the gyro sensor and exceeds the specified range. For another example, since the camera or the illuminance sensor, which is being operated, is hidden by the MSR of the POS terminal 902 and suddenly exposed to surrounding light, the specified event may correspond to the change in the brightness of the image captured by the camera or the change exceeding a specified range in the quantity of light which is detected by the illuminance sensor.

If detecting the event, the electronic device 901 may determine (or select or specify) the radiation pattern P16 of the magnetic pulse which is being radiated through the MST module. According to various embodiments, the electronic device 901 may designate the radiation pattern P16 as the primary radiation pattern and may designate a radiation pattern P15 as the secondary radiation pattern.

According to an embodiment, the electronic device 901 may acquire the information associated with the POS terminal 902 which has already received the magnetic pulse. The information associated with the POS terminal 902 may include at least one of location information acquired from a GNSS module of the electronic device 901, identification information (e.g., a MAC address) of the AP 504 connected with the POS terminal 902 through the Wi-Fi module, or identification information or an outer appearance of the POS terminal 902 collected from the image captured by the camera.

According to an embodiment, the electronic device 901 may store a correlation between the determined radiation pattern P16 and the information associated with the POS terminal 902. According to various embodiments, the electronic device 901 may correlate the determined radiation pattern P16 (the primary radiation pattern) and the radiation pattern P15 (the secondary radiation pattern) with the information associated with the POS terminal 902. The correlation information may be stored in the memory of the electronic device 901 or may be transmitted to a server.

Figure 10:
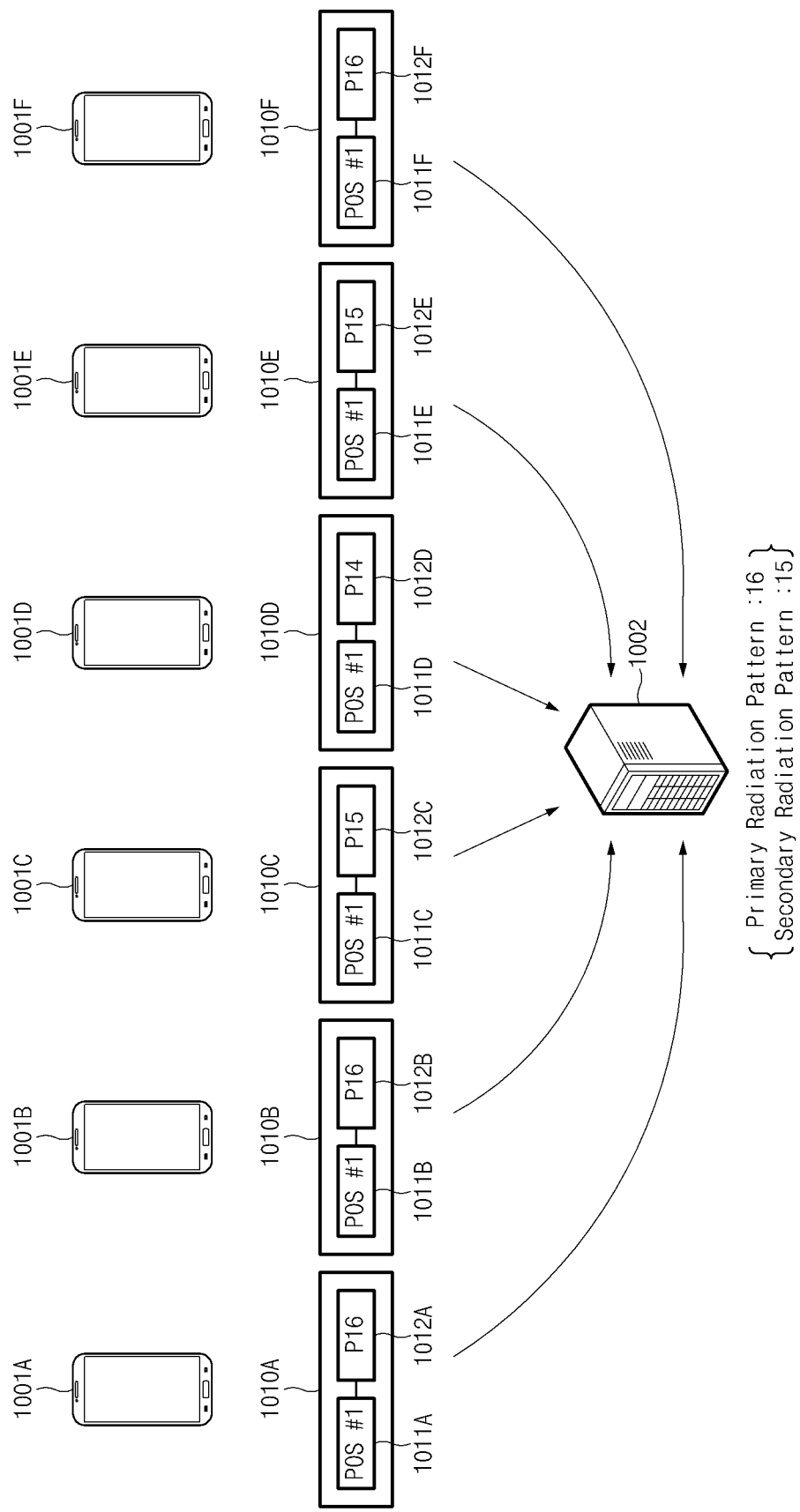
FIG. 10 is a view illustrating that a server collects information on the radiation pattern, according to an embodiment.

FIG. 10 is a view illustrating a method of collecting information on the radiation pattern by a server, further continuing the example embodiment of FIG. 9. Again, it is understood the present invention is not limited to electronic payments.

Referring to FIG. 10, a server 1002 (e.g., corresponding to the mobile payment service server 503 of FIG. 3) may collect correlation information 1010A to 1010F between a radiation pattern and a POS terminal #1 from a plurality of electronic devices 1001A to 1001F.

For example, the electronic devices 1001A to 1001F may perform the payment transaction together with the same POS terminal #1 provided in the same store. The electronic devices 1001A to 1001F may perform, for example, operations shown in FIG. 8 and FIG. 9. Accordingly, the electronic devices 1001A to 100F may determine radiation patterns 1012A to 1012F used in the payment transaction in response a specified event and may acquire the information 1011A to 1011F associated with the POS terminal #1 in various manners.

For example, the electronic devices 1001A, 1001B, and 1001F may specify radiation patterns P16 by using the radiation patterns 1012A, 1012B, and 1012F used in the payment transaction performed together with the POS terminal #1. In addition, the electronic devices 1001C and 1001E may specify radiation patterns P15 by using the radiation patterns 1012C and 1012E used in the payment transaction performed together with the POS terminal #1. The electronic device 1001D may specify a radiation pattern P14 by using the radiation pattern 1012D used in the payment transaction performed together with the POS terminal #1.

The server 1002 may determine the radiation pattern P16, which represents a pattern having the highest use or success frequency, as a primary radiation pattern having the correlation with the POS terminal #1, by reference to the correlation information 1010A to 1010F collected from the electronic devices 1001A to 1001F. Then, the server 1002 may determine the radiation pattern P15 represents a pattern having the second highest use frequency as the secondary radiation pattern in correlation with the POS terminal #1.

After allowing the POS terminal #1 to correlate with the primary radiation pattern P16, and the secondary radiation pattern P15, the server 1002 may transmit the correlation information with the POS terminal #1 to a plurality of electronic devices including the electronic devices 1001A to 1001F to share the correlation information with the POS terminal #1 together. Accordingly, the electronic devices including the electronic devices 1001A to 1001F may first use the primary radiation pattern P16 and the secondary radiation pattern P15 in the payment transaction with the POS terminal #1.

Figure 11:
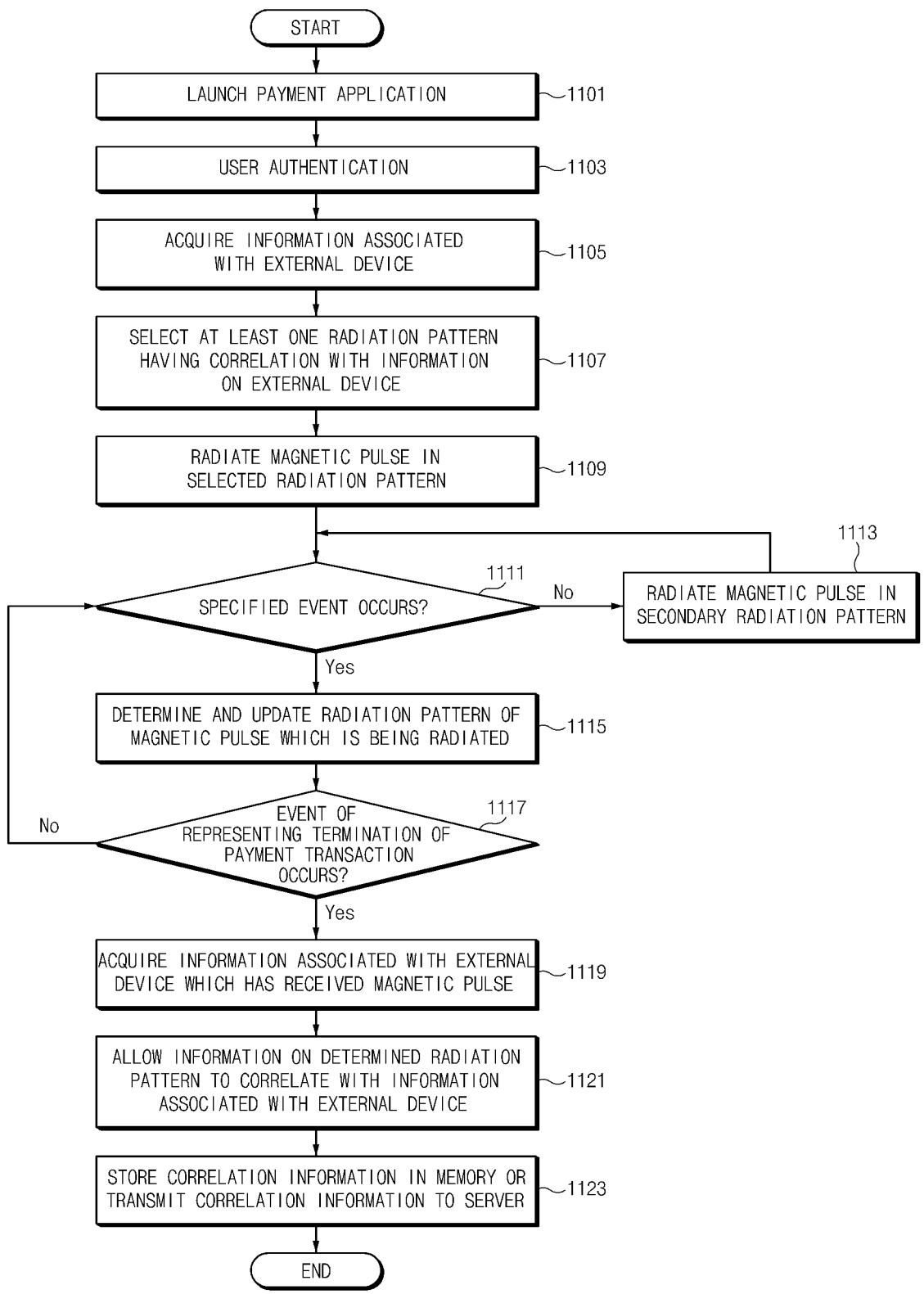
FIG. 11 is a flowchart illustrating the method for mobile payment, according to another embodiment.

FIG. 11 is a flowchart illustrating a method for mobile payment, according to another embodiment. In the present embodiment, the example utilized is an electronic exchange of secure payment information via a smartphone. However, it is understood the present invention is not limited to transactions of payment information, but is relevant to any secure information transacted.

Referring to FIG. 11, the method for mobile payment may include operations 1101 and 1123. Operations 1101 to 1123 may be performed by, for example, the electronic device 501 illustrated in FIG. 5. Each of operations 1101 to 1123 may be implemented with instructions performed (or executed) by the processor 580 of the electronic device 501. The instructions may be, for example, stored in a computer-readable recording medium or the memory 530 of the electronic device 501 illustrated in FIG. 5. The following description on operation 1101 to operation 1123 will be made with reference numerals of FIG. 5 and the redundant details of the same parts as those described with reference to FIG. 8 will be omitted.

In operation 1101, the processor 580 of the electronic device 501 may execute or launch a payment application (e.g., Samsung Pay™). A specified GUI screen may be output to the display 520 in response to the execution of the payment application. In operation 1101, a payment card may be selected to be used in a payment transaction.

In operation 1103, the processor 580 may perform user authentication. The user authentication may include, for example, user authentication using the biometric sensor 554 or the PIN authentication.

In operation 1105, the processor 580 may acquire information associated with the external device 502 which is to receive the magnetic pulse. In other words, the processor 580 may acquire information associated with the external device 502 which is to perform the payment transaction together with the electronic device 501. The information associated with the external device 502 may include at least one of location information acquired from the GNSS module 543, identification information (e.g., a MAC address) of an AP 504 connected with the external device 502 through the Wi-Fi module 542, or identification information or an outer appearance of the external device 502 collected from the image captured by the camera.

In operation 1107, the processor 580 may select at least one radiation pattern having correlation with information associated with the external device 502 which is to perform the payment transaction based on a plurality of radiation patterns (e.g., 601 to 622 of FIG. 6) stored in the memory 530. The correlation (e.g., 710 of FIG. 7) between the external device 502 and the radiation pattern may be previously stored in the memory 530. If the correlation is absent, the processor 580 may request and receive relevant information from the mobile payment service server 503 through the communication circuit 540 (see FIG. 10).

In operation 1109, the processor 580 may control the MST module 570 to radiate a magnetic pulse corresponding to payment data in the radiation pattern selected in operation 1107. The radiation pattern (radiation patterns) of the magnetic pulse and the order of the radiation patterns may be variously provided (which is to be described below with reference to FIGS. 12A to 12C)

In operation 1111, the processor 580 may determine whether a specified event occurs. If the specified event occurs, the processor 580 may proceed to operation 1115. Otherwise, the processor 580 may proceed to operation 1111 after performing operation 1113. For example, the specified event may be an event of representing the success of the payment transaction. For example, the specified event may include an operation that a user rapidly moves the electronic device 501 after the payment transaction is successfully achieved (e.g., an operation that the user retrieves the electronic device 501 placed around the external device 502).

Since the specified event does not occur, that is, the payment is failed, in operation 1113, the processor 580 may radiate the magnetic pulse corresponding to payment data in the secondary radiation pattern through the MST module 570.

If the specified event occurs, the processor 580 may perform operation 1115 to operation 1123. Operation 1115 to operation 1123 may correspond to operation 811 to operation 819 of FIG. 8 which have been described above. In other words, if the payment transaction is successfully achieved, the processor 580 may perform the routine of collecting the correlation between the external device 502 and the radiation pattern. Accordingly, the correlation between the external device 502 and the radiation pattern may be more accurately updated by the electronic device 501 and/or the mobile payment service server 503.

FIGS. 12A to 12E are views illustrating the order of changing a radiation pattern, according to various embodiments. In the present embodiment, the example utilized is an electronic exchange of secure payment information via a smartphone. However, it is understood the present invention is not limited to transactions of payment information, but is relevant to any secure information transacted.

In FIGS. 12A to 12E, an external device performing the payment transaction together with an electronic device may be designed to use a radiation pattern P16. According to an embodiment, the electronic device may select, based on the information associated with the external device, the most promising radiation pattern (e.g., primary radiation pattern) P16 and may select the second promising radiation pattern (e.g., secondary radiation pattern) P15.

The electronic device may set the iterative sequence for changing the radiation patterns, based on the radiation pattern P16 and the radiation pattern P15, as illustrated in FIGS. 12A to 12E. The iterative sequence of the radiation patterns shown in FIGS. 12A to 12E is provided for the illustrative purpose, but the present disclosure is not limited thereto. As long as the radiation pattern P16 and the radiation pattern P15 are set to be output early in the transactional process, the change sequence of the radiation patterns may be varied.

Referring to FIG. 12A, according to an embodiment, the electronic device may change the radiation pattern of the magnetic pulse, which corresponds to payment data, in the descending order, starting from the radiation pattern P16. Accordingly, if the radiation of the magnetic pulse to the external device is started from the time point of T1, the payment transaction may be successfully achieved at a time point of T2 at which the radiation of the magnetic pulse is completed in the format of the radiation pattern P16. According to various embodiments, in the case that the radiation pattern of the magnetic pulse is changed in the descending order from the radiation pattern P16 and arrives at the radiation pattern P1, the electronic device may change the radiation pattern in the descending order from the radiation pattern P16.

Other patterns of iteration of the radiation patterns are possible. Referring to FIG. 12B, according to an embodiment, the electronic device may radiate the magnetic pulse, which corresponds to the payment data, in the format of the radiation pattern P16 and may maintain the format of the radiation pattern P16 without change.

Figure 12C:
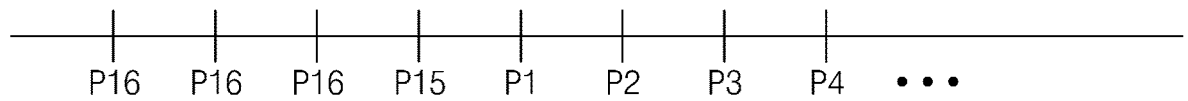

Referring to FIG. 12C, according to an embodiment, the electronic device may radiate the magnetic pulse corresponding to the payment data in the format of the radiation pattern P16, which is the primary radiation pattern, a first set number of times, such as three times. Then, the electronic device may radiate the magnetic pulse in the format of the radiation pattern P15 which is the secondary radiation pattern one time. Thereafter, the electronic device may iterate the radiation pattern of the magnetic pulse in an ascending order from the radiation pattern P1.

Figure 12D:
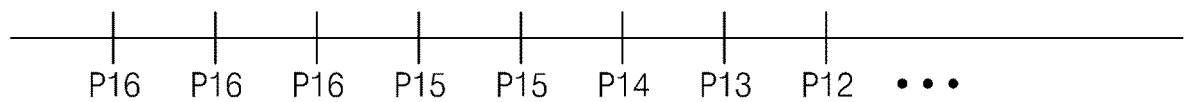

Referring to FIG. 12D, according to an embodiment, the electronic device may radiate the magnetic pulse corresponding to the payment data in the format of the radiation pattern P16, which is the primary radiation pattern, a first set number of times (which in this example is three times) and may radiate the magnetic pulse in the format of radiation pattern P15, which is the secondary radiation pattern, a second set number of times (which in this example is twice). Thereafter, the electronic device may change the radiation pattern of the magnetic pulse in the descending order from the radiation pattern P14.

Figure 12E:
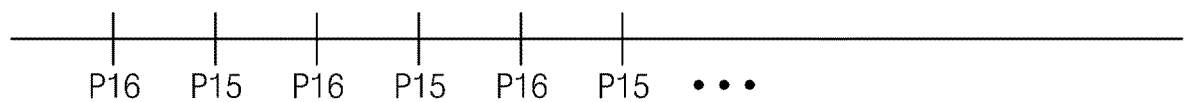

Referring to FIG. 12E, according to an embodiment, the electronic device may radiate the magnetic pulse corresponding to the payment data while alternating between the radiation pattern P16, which is the primary radiation pattern, and the radiation pattern P15 which is the secondary radiation pattern.

According to various embodiments of the present disclosure, electronic devices and/or the mobile payment service server may collect radiation patterns employed for each external device (e.g., POS terminal) in response to the specified event. Since the correlation between the external device and the radiation pattern is stored in the electronic device or the server, a plurality of electronic devices may select the optimal radiation pattern whenever performing the payment transaction. Further, since the optimal radiation pattern may be radiated prior to the other radiation patterns, time utilized in the mobile payment transaction and power consumption in the mobile payment transaction may be reduced.

According to an embodiment, an electronic device may include a communication circuit which communicates with a server, a memory which stores payment data and a plurality of radiation patterns, an MST module which radiates a magnetic pulse corresponding to the payment data in a specific radiation pattern, and a processor electrically connected with the memory, the communication circuit, and the MST module. The processor may be configured to control the MST module to change the specified radiation pattern in specified order, based on the plurality of radiation patterns, to determine the radiation pattern of the magnetic pulse, which is being radiated through the MST module, in response to a specified event, and to store information on the determined radiation pattern in the memory or transmit the information on the determined radiation pattern to the server.

According to an embodiment, the processor may update the information on the determined radiation pattern whenever the specified event occurs.

According to an embodiment, the processor may store the information on the determined radiation pattern in the memory or may transmit the information on the determined radiation pattern to the server, if a message of representing completion of a payment transaction is received through the communication circuit.

According to an embodiment, the processor may store the information on the determined radiation pattern in the memory or may transmit the information on the determined radiation pattern to the server, if a user input is received for stopping radiation of the magnetic pulse.

According to an embodiment, the processor may store the information on the determined radiation pattern in the memory or may transmit the information on the determined radiation pattern to the server, if a specified radiation time elapses.

According to an embodiment, at least one of the plurality of radiation patterns may include a radiation pattern provided from the server.

According to an embodiment, the information on the determined radiation pattern may include information on a primary radiation pattern and information on a secondary radiation pattern.

According to an embodiment, the electronic device may further include an acceleration sensor which detects acceleration of the electronic device. The specified event includes a change exceeding a specified range of the acceleration.

According to an embodiment, the electronic device may further include a camera which captures an image of a surrounding of the electronic device. The specified event may include a change exceeding a specified range of a parameter which represents a capturing condition for the image.

According to an embodiment, the electronic device may further include an illuminance sensor which detects a quantity of light around the electronic device. The specified event includes a change exceeding a specified range in the quantity of light.

According to an embodiment, the processor may acquire information associated with an external device receiving the magnetic pulse, may allow the information on the determined radiation pattern to correlate with the information associated with the external device, and may store correlation information in the memory or transmit the correlation information to the server.

According to an embodiment, the electronic device may further include a GNSS module which acquires location information of the electronic device. The information associated with the external device may include the location information.

According to an embodiment, the communication circuit may include a Wi-Fi module for connecting with an AP around the electronic device. The information associated with the external device may include identification information of the AP.

According to an embodiment, the electronic device may further include a camera which captures an image of a surrounding of the electronic device. The information associated with the external device may include at least one of identification information or an outer appearance of the external device, which is collected from the image.

According to another embodiment, an electronic device may include a memory which stores payment data and a plurality of radiation patterns, an MST module which radiates a magnetic pulse corresponding to the payment data, and a processor electrically connected with the memory and the MST module. The processor may be configured to control the MST module to acquire information associated with an external device receiving the magnetic pulse, to select at least one radiation pattern, which correlates with the information associated with the external device, among the plurality of radiation patterns, and to radiate the magnetic pulse in the selected radiation pattern.

According to an embodiment, the electronic device may further include a GNSS module which acquires location information of the electronic device. The information associated with the external device may include the location information.

According to an embodiment, the electronic device may further include a communication circuit which connects with an AP around the electronic device. The information associated with the external device may include identification information of the AP.

According to an embodiment, the electronic device may further include a camera which captures an image of a surrounding of the electronic device. The information associated with the external device may include at least one of identification information or an outer appearance of the external device, which is collected from the image.

According to an embodiment, the processor may control the MST module to sequentially radiate the magnetic pulse in remaining radiation patterns which are not selected from among the plurality of radiation patterns after radiating the magnetic pulse in the selected radiation pattern.

According to an embodiment, the selected radiation pattern may include a primary radiation pattern and a secondary radiation pattern.

According to an embodiment, the processor may control the MST module to radiate the magnetic pulse in the primary radiation pattern by the first specified number of times and subsequently radiate the magnetic pulse in the secondary radiation pattern by the second specified number of times.

According to an embodiment, the processor may control the MST module to radiate the magnetic pulse by alternating the primary radiation pattern and the secondary radiation pattern.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
   a communication circuit configured to communicate with a server;
   a memory configured to store secure data and a plurality of radiation patterns;
   a magnetic stripe transmission (MST) module configured to radiate a magnetic pulse communicating the secure data; and
   a processor electrically connected with the memory, the communication circuit, and the MST module, wherein the processor is configured to:
   control the MST module to change an emitted radiation pattern of the magnetic pulse in prespecified order to iteratively emit the plurality of radiation patterns;
   in response to detecting a prespecified event, select a presently emitted radiation pattern of the magnetic pulse; and
   store information corresponding to the selected radiation pattern in the memory, or transmit the information corresponding to the selected radiation pattern to the server.

2. The electronic device of claim 1, wherein the processor is configured to:
   update the information related to the selected radiation pattern when the prespecified event is redetected.

3. The electronic device of claim 1, wherein storing the information and transmitting the information are both executed responsive to detecting successful completion of a transaction corresponding to the secure data.

4. The electronic device of claim 1, wherein storing the information and transmitting the information are both executed in response to detecting an input requesting termination of the magnetic pulse.

5. The electronic device of claim 1, wherein storing the information and transmitting the information are both executed in response to detecting expiry of a prespecified radiation time.

6. The electronic device of claim 1, wherein the information corresponding to the selected radiation pattern includes information corresponding to a primary radiation pattern and a secondary radiation pattern selected from among the plurality of radiation patterns.

7. The electronic device of claim 1, further comprising:
an acceleration sensor,
wherein the prespecified event includes detecting, by the acceleration sensor, acceleration of the electronic device exceeding a prespecified acceleration range.

8. The electronic device of claim 1, further comprising:
a camera configured to capture an image,
wherein the prespecified event includes detecting, by the camera, a change in a photographic condition exceeding a prespecified range.

9. The electronic device of claim 1, further comprising:
an illuminance sensor configured to detect a quantity of light,
wherein the prespecified event includes detecting, by the illuminance sensor, a change in illuminance exceeding a prespecified range.

10. The electronic device of claim 1, wherein the processor is configured to:
acquire information for an external device receiving the radiated magnetic pulse;
generating a correlation between the information corresponding to the selected radiation pattern and the information for the external device; and
store the generated correlation in the memory or transmit the generated correlation to the server.

11. The electronic device of claim 10, further comprising:
a global navigation satellite system (GNSS) module configured to acquire a present location of the electronic device,
wherein the information for the external device includes the present location as detected by the GNSS module.

12. The electronic device of claim 10, wherein the communication circuit includes a Wi-Fi module configured to communicatively connect with an access point (AP), and
wherein the information for the external device includes identification information of the AP.

13. The electronic device of claim 10, further comprising:
a camera configured to capture an image of the external device,
wherein the information for the external device includes at least one of identification information or an outer appearance of the external device extracted from the captured image.

14. An electronic device, comprising:
a memory configured to store secure data and a plurality of radiation patterns;
a magnetic stripe transmission (MST) module configured to radiate a magnetic pulse communicating the secure data; and
a processor electrically connected with the memory and the MST module, wherein the processor is configured to:
acquire information associated with an external device receiving the magnetic pulse;
select at least one radiation pattern correlating with the acquired information associated with the external device, the at least one radiation pattern selected from among the plurality of radiation patterns; and
control the MST module to radiate the magnetic pulse in the selected radiation pattern to communicate the secure data to the external device.

15. The electronic device of claim 14, further comprising:
a global navigation satellite system (GNSS) module configured to acquire a present location of the electronic device,
wherein the acquired information includes the acquired present location.

16. The electronic device of claim 14, further comprising:
a communication circuit configured to communicative connect with an access point (AP),
wherein the acquired information associated with the external device includes identification information for the AP.

17. The electronic device of claim 14, wherein the processor is configured to:
after radiating the magnetic pulse in the selected radiation pattern, control the MST to radiate the magnetic pulse according to remaining radiation patterns from among the plurality of radiation patterns different than the selected radiation pattern.

18. The electronic device of claim 14, wherein the selected radiation pattern includes a primary radiation pattern and a secondary radiation pattern.

19. The electronic device of claim 18, wherein the processor is configured to:
control the MST module to radiate the magnetic pulse in the primary radiation pattern a first prespecified number of times, and subsequently, radiate the magnetic pulse in the secondary radiation pattern a second prespecified number of times.

20. The electronic device of claim 18, wherein the processor is configured to:
control the MST module to iteratively radiate the magnetic pulse by alternating radiation of the primary radiation pattern and the secondary radiation pattern.

* * * * *